United States Patent [19]
Mailfert et al.

[11] 4,020,374
[45] Apr. 26, 1977

[54] SUPERCONDUCTING ELECTRIC MOTORS

[75] Inventors: Alain Mailfert, Villers les Nancy; Michel Kant, Paris, both of France

[73] Assignee: Agence Nationale de Valorisation de la Recherche (ANVAR), France

[22] Filed: Mar. 21, 1975

[21] Appl. No.: 560,931

[30] Foreign Application Priority Data

Mar. 28, 1974 France .............................. 74.10962

[52] U.S. Cl. .................................. 310/80; 310/12; 310/13
[51] Int. Cl.² ........................................ H02K 7/06
[58] Field of Search .................... 104/148, 148 LM; 310/12-14, 16, 80, 52, 40, 10; 318/135

[56] References Cited
UNITED STATES PATENTS 3,898,487  8/1975  Sobiepanek et al. ................ 310/80

FOREIGN PATENTS OR APPLICATIONS 945,225  12/1963  United Kingdom .................. 310/80

*Primary Examiner*—Donovan F. Duggan
*Attorney, Agent, or Firm*—Larson, Taylor and Hinds

[57] ABSTRACT

A linear motor comprises an electrically conductive tubular track consisting of one or more pairs of helically wound strips and a movable assembly. The movable assembly includes a superconducting field winding freely spinning about an axis close to the axis of the track and at least one auxiliary polyphase winding of normally conducting material coaxial to the field winding and adapted to develop a rotating field when AC currents circulate therein. The auxiliary winding supporting structure is connected to a vehicle to be driven along the track.

12 Claims, 8 Drawing Figures

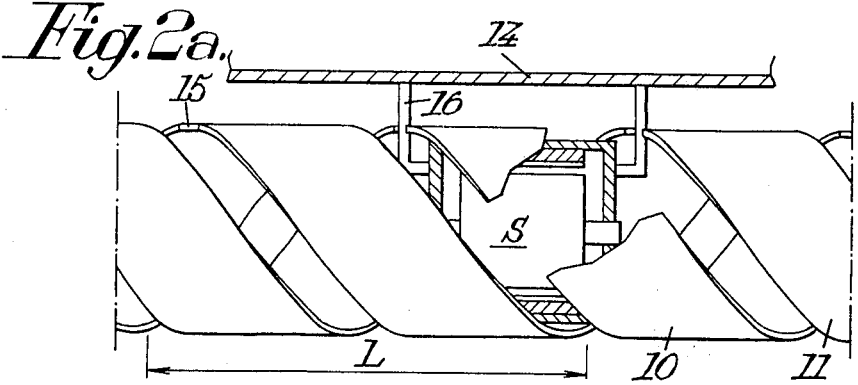
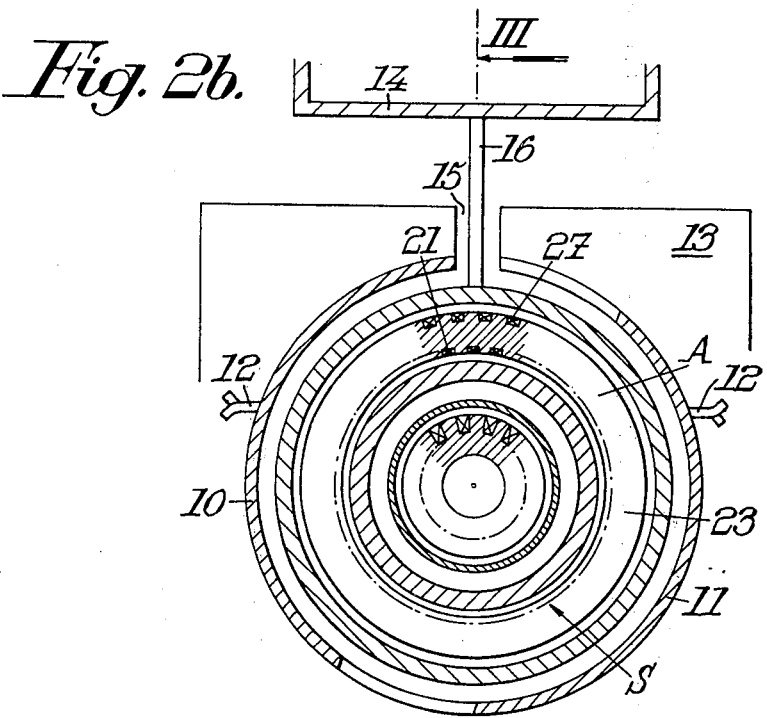
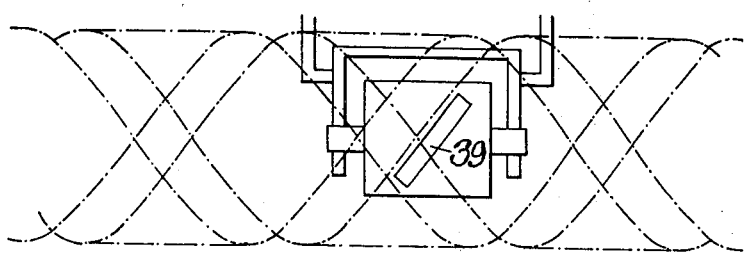

SUPERCONDUCTING ELECTRIC MOTORS

CROSS REFERENCES TO RELATED PATENT APPLICATIONS

The invention relates to electric motors having a superconducting field winding; copending patent applications directed to rotary motors of that type include Ser. No. 412,127 (Renard et al.), 443,014 (Renard et al.) and 443,015 (Mailfert); prior patent applications directed to linear motors of that type include Ser. Nos. 495,095 and 495,096 (Mailfert). Those patent applications are all assigned to the assignee of the present invention.

The present invention relates to electric motors for converting the electric power that they receive from a source fixed on a movable system, such as a vehicle, into mechanical power enabling the movable system to be drawn along a track, said motors being called, for this reason, "linear".

The invention relates more particularly to an electric motor of the above-defined type including a conducting track of generally tubular shape, the members of the motor connected to the movable system being placed inside the track.

It has already been proposed to employ linear electric motors for driving vehicles. Notably, asynchronous motors with a passive track have been proposed, but these have the drawback of requiring a small air-gap, which prohibits giving the suspension of the vehicle a large latitude of movement and gives a power factor which remains small. These drawbacks are avoided by the use of a motor of the type described and claimed in French patent application No.73 29389 filed 10 Aug., 1973 and U.S. patent application Ser. No. 495,496 (Alain Mailfert). This electric motor uses a passive track and, on the driven vehicle, a superconducting rotary field coil, separated from the track by a polyphase winding intended to transmit to the chassis of the vehicle the whole of the tractive force exerted by the motor.

It is an object of the present invention to provide a linear electric motor using a superconducting inductor winding hence capable of creating a high electric field, associated with a passive track of generally tubular shape, which permits high flexibility in use and wide diversity of application.

To this end, the invention provides a linear electric motor with a passive track, characterized notably in that it comprises a non-ferromagnetic, electrically conducting track of generally tubular shape, and an assembly carried by a system movable along the track, comprising an inductor winding, intended to be traversed by a direct current, of superconducting material placed in a cryostat and rotating with it around an axis close to the axis of the track, as well as at least one auxiliary polyphase winding coaxial with the inductor, wound so as to create a field synchronous on the average with the field of the inductor when it is traversed by polyphase alternating currents, and fixed to the movable system, the track and the poles of the inductor being constituted in such a way that the currents induced in the track by the rotation of the inductor exert, on said auxiliary winding, forces of which the resultant has a component parallel to the direction of the track.

The track is advantageously constituted by one or several pairs of helicoidal conducting elements: in this case the inductor and the auxiliary winding may be constituted in conventional manner, with active conductors parallel to the axis of rotation of the inductor. The length of these poles following the axis of the track must remain small (little greater than the width of the slot). In this case, the motor is particularly well-adapted to synchronous operation (this qualification denoting a motor in which the speed V of the movement is equal to $L \times f$, L being the pitch of the helix of the track and $f$ the frequency of rotation of the inductor). However, this motor enables asynchronous starting or, due to the fact that the track is passive, starting by means of an auxiliary asynchronous motor intended to operate for a short duration.

The track may also be constituted by a continuous tube; but in this case the inductor and the auxiliary winding must be wound so as to have poles inclined with respect to the direction of the track. This result may be achieved by using active conductors placed in recesses oblique with respect to the axis (in a helix or in straight lines for example). In a particular embodiment, the inductor and the auxiliary winding are each constituted of several coils of which the active conductors have a different inclination with respect to the axis of the track and means are provided to cause the passage, in the coils of a same winding, of currents in an adjustable ratio. These features may besides be used also with a track constituted by helicoidal strips, if necessary with a pitch variable along the track.

The motor may be designed so as to ensure, at the same time as the propulsion of the vehicle, its levitation by electromagnetic means. In all cases, it is unnecessary to establish between the superconductor inductor winding at very low temperature and the chassis of the vehicle at ambient temperature, mechanical connections for the transmission of large forces which are manifested by high thermal losses.

In a first embodiment of the invention, the inductor is immobilised in translation along its axis with respect to the movable system. In this case, the auxiliary winding must comprise at least two polyphase windings, displaced with respect to one another in axial direction by a distance in the vicinity of one-half of the dimension of the poles of the inductor winding in the direction of the axis, these two windings having the purpose of compensating, one for the torque exerted on the inductor by currents induced in the track, the other for the axial force exerted on the inductor by the same currents. To this end, a servocontrol circuit enables adjustment of the currents passing at least in the second winding.

In another embodiment of the invention, the auxiliary winding only includes a single polyphase winding, but the inductor is mounted in the auxiliary winding so as to be able to be axially movable over a length not exceeding half that of the poles of the inductor, thus enabling the inductor to be placed in an equilibrium position.

The connection between the windings and the movable system placed outside the track requiring the latter to have a longitudinal slot, it will be necessary, either to provide a compensating winding close to the slot, or to reduce the number of conductors close to the slot, in the auxiliary winding.

The invention will be better understood on reading the description which follows of linear motors which constitute thereof particular embodiments given by way of non-limiting examples. The description refers to the drawings which accompany it, in which:

FIG. 2a shows very diagrammatically the helicoidal conductor elements in strip form which constitute the conducting part of the track, as well as the place occupied by the motor members inside the track;

FIG. 2b is a highly simplified sectional view of the motor of FIG. 2, along a plane perpendicular to the axis of the track;

FIG. 5 is a sectional view of another modification.

The linear motors which are to be described by way of example may all be regarded as comprising a conducting fixed track 8 and a mobile assembly movable along the track and connected to the chassis of a vehicle intended to be propelled by one or several motors of the same type, comprising a superconducting inductor representing a magnetic moment $\vec{M}$ and at least one compensating winding creating a rotary field $\vec{Ha}$. The track 8 constitutes an armature in which $\vec{M}$ and $\vec{Ha}$ induce currents creating a field $\vec{Hi}$.

Figure 1A:
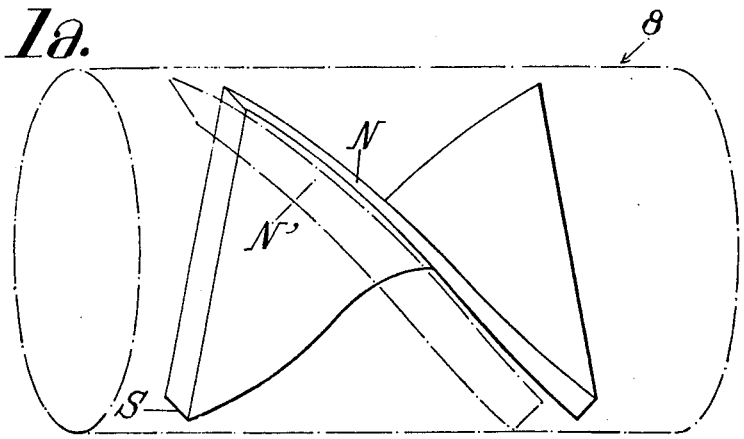
FIGS. 1a, 1b and 1c are functional diagrams intended to illustrate the principle of operation of the various embodiments of the motor according to the invention.
Figure 1B:
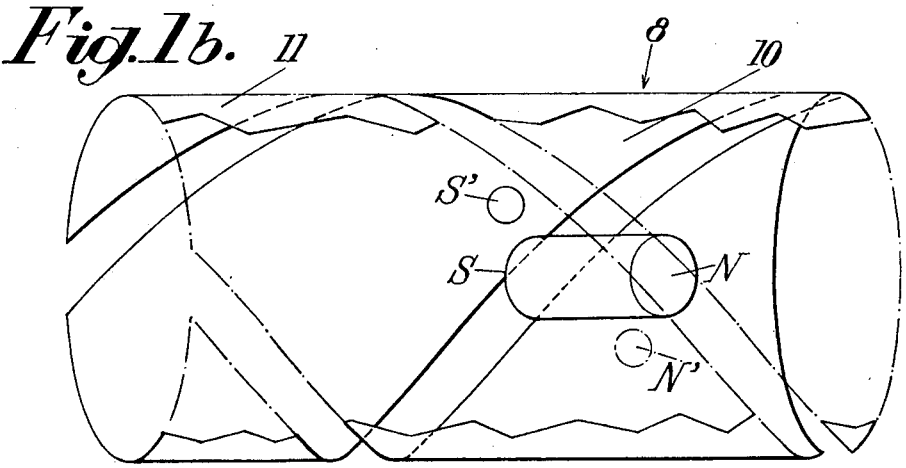
Figure 1C:
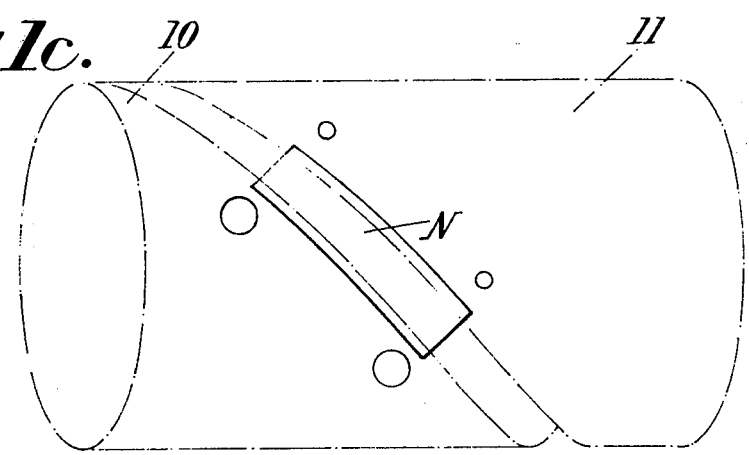

Before passing on to a description of the various embodiments given by way of examples, it may be useful to give general indications, referring to FIGS. 1a to 1c. For simplification, the case will be limited to that of a dipolar inductor.

By way of comparison, consideration will first be given to the case where the track is constituted by a continuous tube and where the inductor is in the form of a simple dipole. In this case the placing in rotation of the inductor in synchronism with the rotary field of the compensating winding is manifested simply by the creation on the track of a torque C:

$$\vec{C} = \vec{M} \wedge (\vec{Hi} + \vec{Ha})$$

In other words, no propulsive force will appear.

On the other hand, according to a first possible embodiment of the invention, a continuous tubular track will be preserved, but the inductor will be given a constitution so that it is similar to a magnet whose north and south poles are in the helicoidal form illustrated in FIG. 1a, or at least a form inclined to the axis of the track 8. The currents induced in the track 8 then create a reaction field similar to that of a magnetic dipole whose poles N' and S' are parallel to the poles N and S, but displaced in the axial direction. The interaction of the poles gives rise to an axial propulsive force which is exerted on the movable assembly comprising the inductor.

In the embodiment of the invention illustrated in FIG. 1b on the other hand, the inductor and the auxiliary winding are constituted so as to be similar to two opposed circular poles N and S, but the track 8 is constituted by two helicoidal strips 10 and 11. In this case the currents induced in the track are deformed by the presence of the slot between the strip and there again their resultants give rise to a field similar to that of a dipole displaced from that corresponding to the inductor in the axial direction. Here again a propulsive force is seen to appear, but which only exists in the case where there is at least approximate synchronism, that is to say, if the advancing pitch of the dipole corresponding to the inductor corresponds to the pitch of the strips 10 and 11.

It is possible to combine the two arrangements defined above to arrive at that illustrated in FIG. 1c, comprising a track 8 including two strips 10 and 11, and an inductor similar to a helicoidal magnet of pitch corresponding to that of the strips 10 and 11. In this case, on synchronism, there occur, in the track, currents close to the ends, as indicated diagrammatically by the lines of force in mixed lines in FIG. c.

FIG. 1c shows that only the ends of the poles give rise to propulsive forces. Consequently it is advantageous to constitute the inductor and the winding which is associated with it so that the induction or field varies along an inductor pole, from a maximum value to zero, then to the maximum, etc., or alternatively from a positive maximum value to a negative maximum, and so on.

Finally the strips 10 and 11 may be of variable pitch, notably to facilitate starting. In this case, when the arrangement of FIG. 1c is used, it is advantageous to give the poles a helicoidal shape with adjustable pitch: this result may be achieved by constituting the indicator of two sets of coils whose active conductors have a different inclination to the axis (possibly opposite to render the motor reversible), means being provided to distribute the currents between the coils in adjustable manner.

Various embodiments corresponding to the diagram of FIG. 1b, will now be described.

In the embodiment illustrated in FIG. 2a, the track is constituted by a pair of non-ferromagnetic helicoidal conductor elements in the form of strips, defining a tubular inner space which contains the movable device. For simplification, it will be assumed in the following that the track only comprises a single pair of conductor elements, and the pitch of the helix will be denoted by L. This is the pitch which, with the rotary speed of rotary mechanism of the movable device, will fix the speed of movement in synchronous operation.

The two conductor elements 10 and 11 in the form of strips (aluminum sectional elements for example), are separated by an axial gap representing a small fraction of the pitch L, anchored in a mass capable of withstanding the reaction forces. The strips may for example be anchored by means of expansion bolts 12 in a concrete mass 13 (FIG. 2b).

Figure 3:
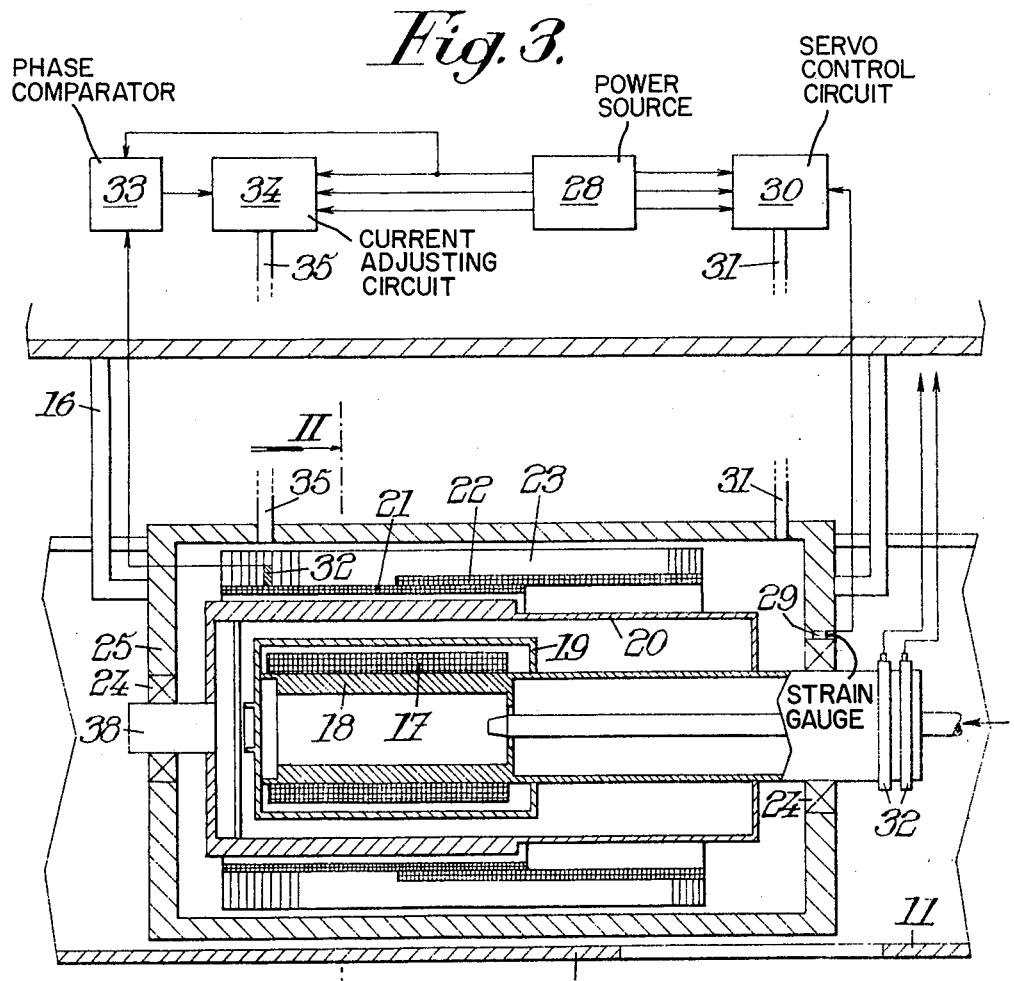
FIG. 3 is a highly simplified sectional view along the line III—III of FIG. 2b.

To allow the passage of the connector between the chassis 14 of the vehicle and the movable device of the motor, which will be described below, a longitudinal slot 15 is formed in the track and in the mass 13. Since this slot 15 has a disturbing effect on the field distribution, it will be advantageous to reduce it to the minimum compatible with the passage of the struts 16 (FIGS. 2 and 3). Naturally, the chassis 14 may be connected to several mobile devices of linear motors, co-operating with the same track or with different tracks. Moreover, if the linear motor is not designed to ensure also the lifting of the device by magnetic levitation, this chassis must be provided with support means, for example axles provided with wheels.

The bipolar inductor synchronous motor illustrated diagrammatically in FIGS. 2b and 3, will now be described more particularly.

The mobile device of the motor of FIGS. 2b and 3 may be regarded as comprising a set of windings A secured to the chassis 14, and a rotary mechanism S.

The assembly S is constituted by a bipolar superconducting inductor winding 17 borne by an insulating mandrel 18. Winding and mandrel are placed in a cryostat having an inner wall 19 and an outer wall 20, the latter being constituted by a jacket of electrically good conducting material, this jacket to constitute an electromagnetic field with respect to the inductor winding. The inductor winding 17 and the mandrel which carries it are provided with cooling channels designed to permit a cryogenic fluid to circulate therein. This arrangement having been described in prior patents of applicant, notably in French Pat. No. 73 06119 of 21 Feb. 1973 and U.S. Pat. application Ser. No. 443,015 to which reference may be made, it is unnecessary to provide a complete description again here. In the same way, the supply of the inductor coil with direct current, at least during the period of starting, and its short-circuiting during steady state operation, may be effected by sliding contacts 32 and by a superconducting switch of the type defined in the above-mentioned patents.

In the embodiment illustrated in FIGS. 2b and 3, the rotary system rotates in the bearings 24 which retain it against axial movement with respect to a frame 25 connected to the chassis 14 by struts 16. It is through these structs that the whole of the drive force is transmitted.

The auxiliary set of windings comprises in this case two windings 21 and 22, both placed in internal recesses of a mandrel on former 23. The winding 21 is a polyphase winding having a number of poles equal to the number of poles of the inductor and to the number of conducting elements of the track (two in the embodiment illustrated). It may for example be a three-phase bipolar winding. The length of the poles of this winding 21 along the axis is substantially equal to the length along the same axis of the poles of the inductor winding 17 and its plane of symmetry, perpendicular to the axis, is the same as that of the inductor coil (plane P of FIG. 3). This winding 21 has the function of annulling the braking torque exerted on the inductor 17 by the currents induced in the conductors 10 and 11 of the track.

The winding 22 is a winding similar to the winding 21, also polyphase bipolar in the illustrated embodiment, having the same length as the winding 21 but offset from the latter, in the direction of the axis of the half track, by a distance close to the axial dimension of the poles of the inductor 17. In other words, the transverse plane of symmetry of the winding 22 is displaced from the plane of symmetry of the inductor winding 10 by a pole half length. The winding 22 has the function of compensating for the longitudinal force exerted on the inductor by the currents induced on the operation of the vehicle.

Measures may be taken to compensate the interfering effect created, on the superconducting inductor 17, by the slot formed in the conducting elements 10 and 11 of the track. In the embodiment illustrated in FIGS. 2b and 3, this operation is assured by a compensating winding 27 arranged on the mandrel 23 close to the slot. This compensating winding is supplied with alternating current of such strength that the field that it produces compensates for the interfering force.

Another solution (not shown) to compensate for the effect of the slot 15 consists, instead of providing a winding 27, of modifying the windings 21 and 22 to reproduce the disturbances of the magnetic field opposite the slot 14. This result is achieved by reducing the number of conductors in the recesses of the mandrel 23 situated in line with the slot.

The windings 21, 22 and possibly 27 are supplied with alternating current by a source 28 placed on the vehicle (FIG. 3).

It is necessary to adjust at all times the current in the winding 22 to keep substantially zero the force exerted on the inductor winding and transmitted by it to the bearings 24. For this, a servo control system is necessary. The system shown in extremely diagrammatic manner in FIG. 2 comprises a force pickup 29 (constituted for example by a strain gauge) borne by the bearing 24 and which sends a signal proportional to the force transmitted to the servo control circuit 30. The circuit 30, which may be of entirely conventional type and many include conventional differentiating or integrating stabilization systems, supplies at all times the winding 22, through a cable 31, with three-phase alternating current of suitable value. Thus servocontrol circuit merely performs a straightforward servo or feedback function whereby the three phase current from source 28 is continuously adjusted in such a manner so as to eliminate the forces exerted on the inductor windings as indicated by a nulling out of the feedback signal from pickup 29.

A similar servocontrol circuit may be associated with the winding 21 so as to keep the rotary field of the inductor 17 permanently in phase with the rotary field of the winding 21. However it is not necessary to have recourse to so complex a device. The embodiment illustrated diagrammatically in FIG. 3 uses a much simpler type of regulation, which is possible on the condition of leaving the inductor winding 17 (which rotates on the average in synchronism with the rotary field of the winding 21) to take with respect to this rotary field a phase shift corresponding to the equilibrium of the motor and retarding torques on the inductor. In principle, it will suffice to supply the winding 21 at any moment with a current corresponding to the maximum value required. However this solution involves high losses. The embodiment illustrated includes a servo-coupling system which maintains in the winding 21 a current such that the phase angle between the rotary field produced by the inductor 17 and the rotary field produced by the winding 21 has a value sufficiently below 90° (value for which loss of synchronism intervenes) for the stability to be sufficient. The servocoupling system includes a position detector 32 borne by the mandrel 23, detecting the phase of the rotary field of the inductor, and a measuring and servocontrol system. This system includes a phase comparator 33 which determines the phase difference between the rotary field detected by 32 and the rotary field produced by the three-phase alternating currents which flow in the winding 21, and a current regulating circuit 34 which sets the current at a value such that the rotary field of the inductor has on the average a phase difference of, for example, 2 $\pi$/3 with respect to the rotary field of the winding 21. It should be noted that sensor 32 produces a signal which is representative of the strength of the magnetic field produced by the D.C. field winding at the location of the sensor and since the D.C. field rotates and the sensor 32 is fixed, this signal will be a time varying signal of approximately sinusoidal shape.

Figure 4:
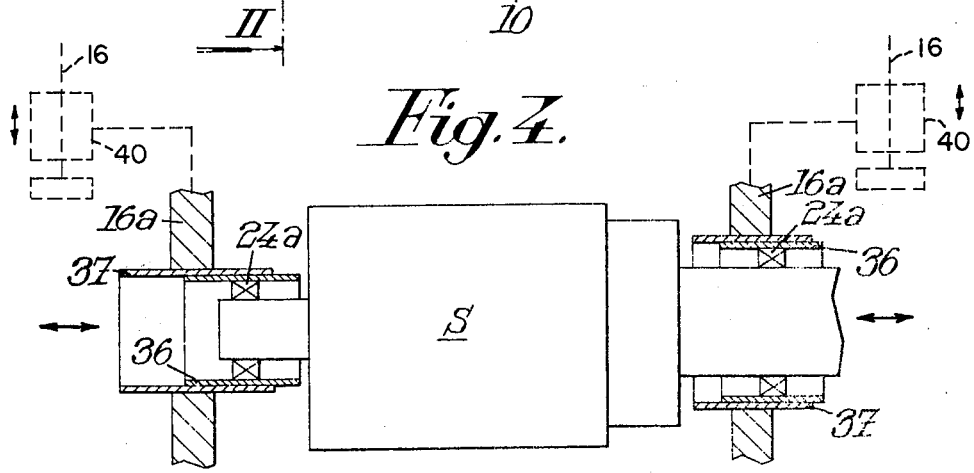
FIG. 4 is a detailed view showing the members intended to support the inductor of a motor constituting a modification of the embodiment of FIGS. 2a, 2b and 3.

Whereas in the embodiment illustrated in FIG. 1, the inductor is fixed in axial translation with respect to the mandrel 23, it is movable in the case of the embodiment shown diagrammatically in FIG. 4. In this Figure there have been shown only the rotary mechanism and the bearings, the latter on exaggerated scale for greater clarity. Each of the bearings, 24a for example, instead of being fixed directly to the beam 16a, is borne by a tube 36 provided with slides enabling it to be moved axially in a tube 37 provided with cooperating slides fixed to the beam 16a. The length of the slide is such that the rotary mechanism S can be moved from one side or the other of the middle plane of the single auxiliary winding (not shown) which is present on the mandrel over a distance corresponding to a half length of the inductor. As is indicated schematically by the dashed line portion of FIG. 4, the inductor mounting may also include an additional pair of tubes or sleeves 40 affixed to tubes 37 by means of beams 16A and movable along vertical struts 16 attached to the vehicle frame, whereby the inductor may be moved vertically with respect to the auxiliary winding.

The sliding supply contacts of the inductor (not shown) must obviously be also modified with respect to those illustrated in FIG. 3. For example the brushes of these sliding contacts of the tube 36 may be made fast and connected by flexible braids to supply lugs fixed on the solid structure of the vehicle. In the same way, there must be provided, for the supply of liquid helium and the recovery of the gaseous helium, flexible connecting pipes, the rest of the installation being conventional and according to the arrangement described in the above-mentioned French patent. The winding 21, and if necessary the winding 22, may also be constituted as described in this patent, it being however understood that cooling by air seems to be more suitable in the case of use of the motor on a high speed transport vehicle.

In the embodiment illustrated in FIG. 4, the inductor 17 may not only be unlocked in rotation (if the phase difference between the rotary fields exceeds $\pi/2$) but also unlocked in translation, if the force along the axial direction produced by the winding 21 on the inductor is not sufficient to balance the force produced by the current induced by the track, whilst the displacement in the axial direction exceeds the value corresponding to the maximum. To avoid this risk, it is necessary to maintain in the winding 21 a current sufficient for the average displacement of the inductor with respect to the winding 21 in the axial sense not to exceed a predetermined fraction, for example two-thirds, of the corresponding displacement on unlocking. It suffices for this to provide a simple position detector, such as a linear potentiometer controlled by the relative movement of the rotary assembly and of the frame, which fixes the current supplying the winding 21, to the extent that the maintenance of a suitable axial displacement corresponds to a current higher than that necessary besides for limiting the phase difference of the rotary speeds to a value of 60°.

The motor which has just been described having synchronous operation, a starting system must be used to bring it to its synchronising speed, except where there is provided on the vehicle a source of electrical supply at a variable frequency from substantially zero value. This solution is of little interest, since it complicates the supply and, on the other hand, leads to a very low starting torque.

With a fixed frequency electrical supply, a possible way of starting consists of rotating the inductor, then not energized, until it is brought to synchronism, by means of an auxiliary motor (not shown), placed at the end of the shaft 38. The inductor 17 is then progressively supplied with current. The configuration of the machine gives it a propelling force along the axis. The force thus developed remaining small, it is even preferable to use a conventional linear asynchronous auxiliary motor placed on the vehicle to ensure the initial part of starting.

This problem of starting is avoided in another embodiment of the invention enabling the motor to operate as a synchronisable asynchronous motor. For this, the coil 17 as well as the windings 21 and 22 are constituted so that they create not only a rotary magnetic field, but also a longitudinal component. The composition of these fields must be such that the coil and windings give rise to helicoidal magnetic fields whose pitch is identical with the pitch L of the conductor elements 10 and 11 of the track to enable synchronous operation.

This arrangement, useful both in the case where there are two auxiliary windings 21 and 22 and in the case where there is only one of them 21, enables the creation of an asynchronous starting force by induction of the current in the track (this force being then independent of the presence of slots separating the elements 10 and 11).

To achieve this result, that is to say to give the poles a configuration having, for the inductor, the configuration shown at 39 in FIG. 5, it is possible to proceed in various ways. A first solution consists of placing the constituent conductors of the inductor coil 10, of the winding 20 and if necessary of the winding 22,, in recesses which, instead of being parallel to the axis, are helicoidal and of pitch L. In this case, it is no longer necessary to limit the length of the active parts of the coils and windings, as in the case of FIGS. 1 to 4, to a pitch of about half a pole. It is possible to go to a length of the active portion which is several times the diameter of the machine.

If the modified motor has two windings 20 and 22, the latter may be placed on two helices separated angularly. There is no essential value for this separation, which can reach, measured along the axis, a quarter of the pitch of the helix.

In the case of the embodiment illustrated in FIG. 4 which is adapted to asychronous starting, it is necessary to limit the longitudinal displacement of the inductor coil 17 with respect to the single auxiliary winding 20. To avoid the use of metallic stops, members which would constitute sources of loss of frigories, the limitation of the axial displacement of the inductor is advantageously ensured by shortening of the pitch of the helix of the winding 21, at the ends of the latter, to give rise to a magnetic stop effect. For example, the pitch of the helix may be brought back to half the value on the terminal portions of the length equal to a half-pole pitch, this value never being limiting. Another solution enabling the poles of the winding 21 (and if necessary of the winding 22) to be given a helicoidal form whilst leaving the leads in the recesses parallel to the axis, consists of displacing the coils corresponding to the different phases of the winding, with respect to one another in the direction of the axis of the track. The resulting field thus includes a component of the rotary field (produced by the linear portion and parallel to the axis of the windings) and a sliding field component (produced by the coil heads having junctions in a helix). This arrangement has the advantage over the preceding one of being easier to construct, but the drawback of providing a magnetic field which is disturbed with respect to the optimal configuration.

In the two cases, the synchronisable asynchronous motor thus realised may be started from rest. For this, the rotary mechanism is started at its speed of synchronism by means of an auxiliary motor (not shown) placed at the end of the shaft 38. Once the inductor is synchronism with the rotary field produced by the winding 21 thus supplied, the current in the inductor is gradually increased. The motor then starts up due to the current induced in the track. Once synchronism is almost reached, coupling of the motor occurs, the rotary field of the coil 21 being coupled in synchronism with the helicoidal slots of the track.

In the arrangements which have been described hitherto, the superconducting inductor does not supply any lifting force on displacement if it remains coaxial with the track. It can provide such a force if the axis of the movable mechanism is shifted vertically with respect to the track, but in this case, there is the drawback of the need for a strong mechanical linkage, constituting a thermal loss, path between the inductor and the stator. Yet another embodiment of the invention, suitable for use with two auxiliary windings (case of FIG. 2) as with a single auxiliary winding (case of FIG. 4), permits this force to be sustained on a member at normal temperature.

According to a first embodiment of this feature, the mandrel on former 23 bears an additional winding, wound in the same manner as the winding 21 (that is to say, in the case contemplated, polyphase bipolar and of generally cylindrical shape). However the axis of this additional winding, which remains parallel to the axis of the track, is offset vertically with respect to this track axis by a distance which is determined in each case according to the lifting force to be provided. The additional winding is associated with a servocontrol circuit of which the detector element is constituted by strain gauges placed on the bearings 24 which support the shaft. This servocontrol circuit regulates the current in the additional winding to a value which practically annuls the lifting force exerted on the inductor, transmitted through the bearings, and makes the additional winding, constituted of a normally conducting material support that force.

In another modification, the transfer of the lifting force is ensured by placing the bearings 24 which support the inductor shaft on slides permitting vertical shift with respect to the assembly affixed to the vehicle. On operation of the device, the longitudinal axis of the inductor moves with respect to the axis of the winding 21 (and, if such exists, of the winding 22) and to the axis of the track in the middle vertical plane of the latter, until the force on the inductor superconducting coil is zero and the lifting force is wholly applied to the winding 21.

By means of the arrangements which have just been described, it is possible to lighten the bearing elements of the vehicles very substantially, since the vehicle only rests on them when stopped and at low speed.

The invention is also capable of very many modifications. For example the inductor superconducting winding may be constituted so as to give each pole (of substantially circular shape in the case of the embodiments of FIGS. 2 to 4, and helicoidal in the case of FIG. 5) an arrangement such that the field is no longer substantially constant in line with the inductor, but takes alternately, along the pole, values $+H$, $O$, $+H$, ... or even $+H$, $-H$, $+H$, ... Although the winding thereof is complicated, it is rewarded by a higher torque per unit mass.

It goes without saying that this modification, as well as more generally all those within the scope of equivalents, are covered by the present patent.

We claim:

1. Linear electric motor, comprising: a passive, electrically conducting, tubular track,
   an assembly movable along the track, said assembly comprising a D.C inductor coil of superconducting material, freely rotatable about an axis close to the track, and at least one normally conducting auxiliary polyphase winding coaxial with the inductor coil, wound so as to create a field rotating in synchronism with the field of the inductor coil, when polyphase A.C. currents delivered by a power source circulate therein,
   and means for transmitting driving forces directed parallel to the track from the auxiliary winding to a vehicle to be moved along the track.
   the track and the poles of the inductor coil being constituted such that the currents induced in the track by the rotation of the inductor coil exert forces on said auxiliary winding whose resultant has a component parallel to the direction of the track.

2. Motor according to claim 1, wherein the inductor is connected to the vehicle against linear movement parallel to the axis thereof and said assembly comprises first and second polyphase windings offset with respect to one another in the axial direction by a distance approximating one-half of the dimension of the poles of the inductor winding, in the direction of the axis, the first winding compensating for the torque exerted on the inductor by the currents induced in the track and the second compensating for the axial force exerted on the inductor by the currents induced in the track in operation.

3. Motor according to claim 2, having a servocontrol circuit which adjusts the currents passing at least in the second winding to a value such that the axial force exerted on the inductor is lower than a predetermined threshold.

4. Motor according to claim 1, wherein the auxiliary winding comprises a single polyphase coil and the inductor is mounted in the auxiliary winding so as to be axially movable over a length not exceeding one-half the length of the poles of the inductor.

5. Motor according to claim 1, further comprising an additional levitation winding, fixed to the vehicle, similar to the auxiliary winding, and whose axis is offset vertically from that of the inductor and of the auxiliary winding.

6. Motor according to claim 5, further comprising a servocontrol circuit adjusting the current passing in the additional winding to a value such that the vertical force exerted on the inductor is substantially zero.

7. Motor according to claim 1, wherein the inductor is mounted in the auxiliary winding so as to be vertically movable with respect to the latter.

8. Motor according to claim 1, wherein said track is formed with a longitudinal slot and said assembly is connected to the vehicle by strut members projecting through said slot, said assembly comprising a winding for compensating the effect of said slot.

9. Linear synchronous electric motor comprising:

a. a tubular track having at least one pair of strips of electrically conducting material helically wound about an axis,
b. an assembly mounted for movement along said track and comprising:
  i. at least one auxiliary polyphase winding of normally conducting material carried by a frame, said winding having an axis close to the axis of said track and wound to deliver a rotating field when polyphase A.C. currents are circulated therein by an external source,
  ii. a superconducting D.C. inductor coil having at least one pair of poles and mounted for rotation with respect to said frame about the said axis of said polyphase winding and in synchronism with said rotating field, and
  iii. mechanical means for transmitting drive forces from said frame to a vehicle to be moved along the track.

10. Linear electric induction motor comprising:
a. a tubular track having an axis and constructed of electrically conductive material, said track being of substantially circular cross-section and including a longitudinal slot therein, and
b. an assembly mounted for movement along said track and comprising:
  i. at least one auxiliary polyphase winding of normally conducting material carried by a frame, said winding being wound to deliver a rotating field when polyphase A.C. currents are circulated therein by an external source, and having an axis close to the axis of said track,
  ii. a superconducting D.C. inductor coil having at least one pair of poles and being mounted for rotation with respect to said frame in synchronism with said rotating field about the axis of said auxiliary winding, said inductor and auxiliary winding being wound such that the poles thereof are inclined with respect to the longitudinal axis of the track, and
  iii. and mechanical means, projecting through said slot, for transmitting drive forces from said frame to a vehicle to be moved along the track.

11. Motor according to claim 10, wherein the inductor and the auxiliary winding are each constituted by several coils whose active conductors have an inclination different with respect to the axis of the track, and means are provided to pass currents within an adjustable ratio in the coils of a same winding.

12. Motor according to claim 10, wherein the inductor and the auxiliary winding are constituted so that each pole provides a field which varies alternately along the inductor between a maximum value H and a lower value.

* * * * *